United States Patent
Vetrovec

(10) Patent No.: US 7,609,741 B2
(45) Date of Patent: Oct. 27, 2009

(54) DISK LASER INCLUDING AN AMPLIFIED SPONTANEOUS EMISSION (ASE) SUPPRESSION FEATURE

(75) Inventor: Jan Vetrovec, Larkspur, CO (US)

(73) Assignee: The Boeing Company, Chicago, IL (US)

( * ) Notice: Subject to any disclaimer, the term of this patent is extended or adjusted under 35 U.S.C. 154(b) by 248 days.

(21) Appl. No.: 11/626,096

(22) Filed: Jan. 23, 2007

(65) Prior Publication Data

US 2008/0175288 A1    Jul. 24, 2008

(51) Int. Cl.
*H01S 3/07* (2006.01)
*H01S 3/14* (2006.01)
(52) U.S. Cl. .................. 372/67; 372/68
(58) Field of Classification Search ............ 372/34, 372/36, 71
See application file for complete search history.

(56) References Cited

U.S. PATENT DOCUMENTS

| 4,849,036 | A |   | 7/1989 | Powell et al. |
| 5,553,088 | A | * | 9/1996 | Brauch et al. ............. 372/34 |
| 6,625,193 | B2 |   | 9/2003 | Vetrovec |
| 6,963,592 | B2 |   | 11/2005 | Huonker et al. |
| 2002/0110164 | A1 | * | 8/2002 | Vetrovec ............. 372/36 |

* cited by examiner

*Primary Examiner*—Minsun Harvey
*Assistant Examiner*—Patrick Stafford
(74) *Attorney, Agent, or Firm*—Charles L. Moore; Moore & Van Allen, PLLC

(57) ABSTRACT

A laser system may include a first portion of laser host material adapted for amplification of laser radiation and a second portion of laser host material surrounding the first portion which may be adapted for suppression of ASE. The first portion of laser host material and the second portion of laser host material may be respectively doped at a different predetermined concentration of laser ions. A heat exchanger may be provided to dissipate heat from the first portion and the second portion.

24 Claims, 4 Drawing Sheets

DISK LASER INCLUDING AN AMPLIFIED SPONTANEOUS EMISSION (ASE) SUPPRESSION FEATURE

BACKGROUND OF THE INVENTION

The present invention relates to lasers and more particularly to a disk laser including an amplified spontaneous emission suppression (ASE) feature and a method for making the disk laser.

Amplified spontaneous emission (ASE) is a phenomenon wherein spontaneously emitted photons traverse a laser gain medium or laser host material and may be amplified (multiplied) before they exit the gain medium volume. A favorable condition for ASE is a combination of high gain and a long path for the spontaneously emitted photons. ASE may depopulate the upper energy level in an excited laser gain medium and may rob the laser of its power. Additionally, reflection of ASE photons at gain medium boundaries may provide feedback for parasitic oscillations that aggravate the loss of laser power. If unchecked, ASE may become large enough to deplete the upper level inversion in high-gain laser amplifiers. Furthermore, in certain disk lasers, such as ytterbium disk lasers and similar lasers, excessive ASE may lead to failure of the laser disk. Thus ineffective ASE suppression may require operating the laser disk at a substantially lower than design gain and may reduce the robustness and reliability of the laser system.

FIG. 1 is an illustration of a prior art thin disk laser 100. The disk laser 100 may include a laser host material of yttrium aluminum garnet (YAG) doped with laser ions, such as trivalent ytterbium ($Yb^{3+}$) ions which are known to have a laser transition in the vicinity of 1029 nm. A back face 106 of the disk laser 100 may be bonded to a heat sink 108.

A front face 104 of the Yb:YAG disk laser 100 may receive pump radiation 102 at about 941 nm which is absorbed by the $Yb^{3+}$ ions and excites them to a laser transition centered at about 1029 nm. The pump radiation 102 may be made to illuminate only a central portion 110 of the disk laser 100, as illustrated by the broken or dash lines in FIG. 1. Yb:YAG being a quasi-3 level material normally exhibits absorption of light in the vicinity of its peak lasing wavelength of 1029 nm. To overcome such absorption, pump radiation 102 may be sufficiently intense to make the Yb:YAG material in the disk laser 100 transparent (non-absorbing) at 1029 nm. Hence, the central portion 110 of the disk 100 may exhibit a net laser gain which makes it suitable for amplification of laser radiation in the vicinity of 1029 nm. On the other hand, an annular edge portion 112 of the disk 100 does not receive any substantial pump radiation 102. The disk 100 is monolithic and the central portion 110 and the edge portion 112 have the same doping and laser host material. As a result, the edge portion 112 not receiving any substantial pump radiation 102 may absorb radiation at 1029 nm. ASE radiation is emitted as the $Yb^{3+}$ laser ions in the central portion 110 spontaneously decay from their excited state. Some portion of the ASE radiation may be trapped between the front surface 104 and the back surface 106 of the disk 100 and may travel in a zigzag-like path from the central portion 110 to the edge portion 112. If the amount of ASE radiation is rather small, the ASE radiation is effectively absorbed in the edge portion 112. In this fashion, the possibility for an ASE photon being reflected from a disk edge 114 (e.g., by Fresnel reflection) and being re-amplified in the central portion 110 is very remote. However, with increasing ASE intensity, such as may be experienced because of increased pumping and/or a non-lasing condition in the central portion 110, ASE photons entering the edge portion 112 may deplete the absorption property or capability of the edge portion 112 which is integral and homogeneous with the central portion 110 and has the same doping. Hence, the likelihood of ASE photons returning to and being re-amplified in the central portion 110 may be significantly increased. As a result, laser gain may be substantially depleted. If ASE intensity is further increased (e.g., due to increased pumping or due to a pause in lasing) parasitic lasing across the disk diameter may occur and the concomitant increase in thermal load may cause permanent damage to the laser disk 100.

BRIEF SUMMARY OF THE INVENTION

In accordance with an embodiment of the present invention, a laser system may include a first portion of laser host material adapted for amplification of laser radiation and a second portion of laser host material surrounding the first portion which may be adapted for suppression of ASE. The first portion of laser host material and the second portion of laser host material may be respectively doped or fabricated at a different predetermined concentration of laser ions. A heat exchanger may be provided to dissipate heat from the first portion and the second portion.

In accordance with another embodiment of the present invention, a thin disk laser may include a central portion of laser host material doped or fabricated with laser ions at a first predetermined concentration for amplification of laser radiation. The laser may also include an edge portion of laser host material surrounding the central portion and doped or fabricated with laser ions at a second predetermined concentration for suppression of ASE. The second predetermined concentration may be substantially higher than the first predetermined concentration.

In accordance with another embodiment of the present invention, a method for making a laser system may include forming a first plate of laser host material adapted for absorption of ASE. The method may also include forming a second plate of laser host material adapted for amplification of laser radiation. The method may further include forming an opening in the first plate to receive the second plate within the first plate to form a disk laser assembly.

In accordance with another embodiment of the present invention, a method for suppressing ASE in a laser system may include disposing a central portion of laser host material within a substantially annular edge portion of laser host material. The central portion of laser host material may include laser ion doping at a first predetermined concentration for amplification of laser radiation. The substantially annular edge portion of laser host material may include laser ion doping at a second predetermined concentration for absorption of ASE.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As used herein, laser gain medium (LGM) may refer to an optical material having a host lattice doped with suitable ions, which may be pumped by an external source, such as a laser or other optical radiation to a laser transition. Examples of host lattice material that may be used in conjunction with the present invention may include yttrium aluminum garnet (YAG), gadolinium gallium garnet (GGG), gadolinium scandium gallium garnet (GSGG), lithium yttrium fluoride (YLF), yttrium vanadate, phosphate laser glass, silicate laser glass, sapphire or similar materials. The host material may be in a single crystal form or in a poly-crystalline (ceramic) form. Suitable dopants for such lasing mediums may include titanium (Ti), cobalt (Co), chromium (Cr), praseodymium (Pr), neodymium (Nd), samarium (Sm), europium (Eu), gadolinium (Gd), terbium (Tb), dysprosium (Dy), holmium (Ho), erbium (Er), thulium (Tm), and ytterbium (Yb). Preferred dopants may be quasi-3 level ions such as holmium (Ho), erbium (Er), thulium (Tm), and ytterbium (Yb). Optical pump sources may be selected based on the absorption characteristics of the selected laser gain medium. For example, semiconductor diode lasers may be used for the optical pump source. The present invention is not intended to be limited to any specific lasing or laser gain material, or a specific pump source. Laser gain medium may also be referred to herein as laser gain material or laser host material or medium.

Figure 2:
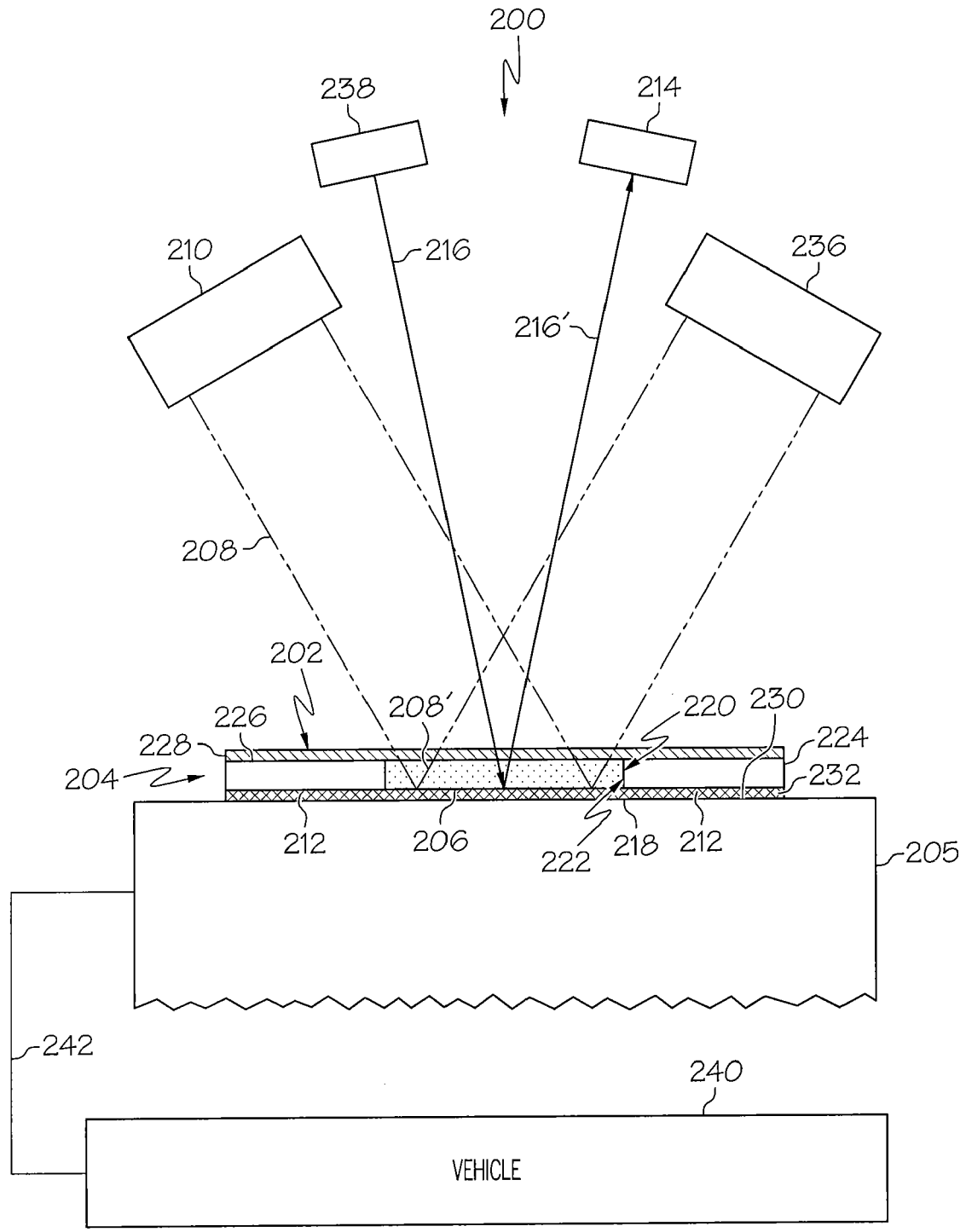
FIG. 2 is an illustration of a laser system including an ASE suppression feature in accordance with an embodiment of the present invention.

FIG. 2 is an illustration of a laser system 200 including an ASE suppression feature 202 in accordance with an embodiment of the present invention. The laser system 200 may be a thin disk laser (TDL) laser system or similar system. The system 200 may include a thin disk laser gain assembly 204. The thin disk gain assembly 204 may be attached to and in a good thermal communication with a heat sink 205 or other suitable heat exchanger. The laser gain assembly 204 may include a first portion or central portion 206 of laser host material adapted for receiving of pump radiation 208 from a source of pump radiation 210 and being pumped by the radiation 208 to a laser transition as described in more detail herein. The laser radiation source 210 may be a diode laser or other source for providing optical pumping.

The laser gain assembly 204 may also include a second portion or edge portion 212 of laser host material surrounding the first portion or central portion 206. The edge portion 212 may be adapted to suppress or absorb ASE as described herein. The laser gain assembly 204 or laser host material may be selected from a group including yttrium aluminum garnet (YAG); gadolinium gallium garnet (GGG); gadolinium scandium gallium garnet (GSGG); potassium gadolinium tungstate (KGW); potassium yttrium tungstate (KYW); fluoroapatite (FAP), lithium yttrium fluoride (YLF); phosphate laser glass; silicate laser glass; sapphire; or other suitable host material for laser ions.

The first portion 206 or central portion of laser host material may include doping with laser ions at a first predetermined concentration for amplification of laser radiation. The first portion 206 may be doped with laser ions at a density or concentration such as may be required for laser operation under specific pumping conditions and characteristics of an out-coupling mirror, such as out-coupling mirror 214. In one embodiment of the invention the first portion 206 may be doped with quasi-3 level laser ions, such as trivalent ytterbium ($Yb^{3+}$); trivalent holmium ($Ho^{3+}$), trivalent erbium ($Er^{3+}$); trivalent thulium ($Tm^{3+}$); or other suitable quasi-3 level ions. The out-coupling mirror 214 may couple an output laser beam 216 to other optical components for directing the laser beam 216 on an object or target.

The second portion or edge portion 212 may be generally annular in shape and may be doped with the same laser ions as the first portion 206 but at a second predetermined concentration. The doping concentration or density of the edge portion 212 may be substantially higher than the doping concentration or density in the central portion 206 or first portion to promote ASE absorption or suppression in the edge portion 212. Preferably, the doping concentration of laser ions in the second portion may be at least 10% higher than in the first portion. Most preferably the doping concentration of laser ions in the second portion may more than 50% higher than in the first portion. In particular, it is known in the art that Yb can be doped into YAG lattice with up to 100% concentration. For example, in a Yb:YAG thin disk gain assembly 204 the first portion 206 may have a 10% atomic concentration of Yb and the second portion 212 may have a 15% atomic concentration of Yb. Accordingly, the central portion 206 may be adapted for amplification of laser radiation and the edge portion 212 may be adapted for suppression or absorption of ASE in accordance with their respective doping concentration or density of laser ions. One advantage of using the same type of ion in both the first portion 206 and the second portion 212 is that the two potions may be made to have substantially similar coefficient of thermal expansion and thus the two portions may be attached without inducing excessive thermal stresses at their joint. Furthermore, in case the laser beam 216 becomes misaligned and illuminates any part of the second portion 212, the quasi-3 level nature of the ions reduces the absorption of laser light in that part and overheating of the material may thus be prevented.

In another embodiment of the invention, the edge portion 212 may be doped with a different kind of ion from that of the central portion 206. In this case, the ions for doping into the first portion 206 may be any suitable lasing ions including but not limited to trivalent ytterbium ($Yb^{3+}$); trivalent holmium ($Ho^{3+}$); trivalent erbium ($Er^{3+}$); trivalent thulium ($Tm^{3+}$); trivalent neodymium ($Nd^{3+}$); trivalent dysprosium ($Dy^{3+}$); trivalent praseodymium ($Pr^{3+}$); trivalent dysprosium ($Dy^{3+}$); trivalent titanium ($Ti^{3+}$); trivalent chromium ($Cr^{3+}$); tetravalent chromium ($Cr^{4+}$); and divalent cobalt ($Co^{2+}$). The ions for doping into the second portion 212 may be selected to absorb spontaneous emission generated in the first portion 206. Such suitable ions must be compatible with the host material and doped there into with appropriate valence.

As will be described in more detail with reference to FIG. 3, the central portion 206 may have a substantially cylindrical shape and the edge portion 212 may have a substantially annular shape. The central portion 206 may be adapted to fit within the edge portion as illustrated in FIG. 2 to form an interface 218 between an outer cylindrical face 220 of the central portion 206 and an inner annular face 222 of the edge portion 212.

The central portion 206 and the edge portion 212 may be co-joined to form an optically continuous and monolithic body 224 having substantially minimal variation in the index of refraction across the interface 218. The thin disk gain assembly 204 including such a composite construction of two distinctly doped portions, central portion 206 and edge portion 212, may be formed by a sintering process. For example, the two distinctly doped portions may be co-sintered during fabrication of polycrystalline YAG components or other laser host material. In another embodiment of the present invention, the two distinctly doped portions 206 and 212 can be diffusion bonded along a conical interface and sliced into disks as described in more detail with respect to FIG. 4 or may be joined by any suitable method.

The thin disk gain assembly 204 may also include a front surface 226 coated with an anti-reflective (AR) coating 228 and a back surface 230 coated with a highly-reflective (HR) coating 232. The front surface 226 and the back surface 230 may be machined to optical flatness and mutual parallelism.

The thin disk laser gain assembly 204 may be mounted on a heat sink 205 or other heat dissipation means for receiving and dissipating heat from the laser gain assembly 204. The thin disk laser gain assembly 204 may be attached to the heat sink 205 by an adhesive, solder, or other suitable means. The disk laser gain assembly 204 may also be attached to the heat sink 205 by hydrostatic clamping similar to that described in U.S. Pat. No. 6,625,193, entitled "Side-Pumped Active Mirror Solid-State Laser for High-Average Power" by Jan Vetrovec, issued Sep. 23, 2003, assigned to the same assignee as the present invention and incorporated herein in its entirety by reference.

As described in more detail herein, a pump radiation reflector 236 may reflect unabsorbed pump radiation from the central portion 206 of the laser gain assembly 204 back to the central portion 206 for further absorption of the pump radiation 208. An end mirror 238 may reflect the amplified laser radiation or laser beam 216 back to the central portion 206. The amplified laser beam 216' may then be reflected from the highly-reflective coating 232 to the out-coupling mirror 214.

In operation of the laser system 200, the optical pump radiation source 210 may generate an optical pump beam or radiation 208, which may be directed onto the laser gain material of the central portion 206 of the disk gain assembly 204. The pump beam 208 passes through the AR coating 228 into the laser host material or laser gain material of the central portion 206. The laser pump radiation 208 may be at least partially absorbed by the laser gain material of the central portion 206 of the laser gain assembly 204. Any unabsorbed portion of the pump beam 208 may be reflected from the HR coating 232 and passes back through the laser gain material of the central portion 206 in a generally reverse direction relative to the first pass. The reflected, unabsorbed pump beam or radiation 208' may again be at least in partially absorbed as it passes back through the laser gain material of the central portion 206. The unabsorbed portion of the pump beam 208' may exit the front surface 226 of the central portion 206 through the AR coating 228 and may be directed onto the pump radiation reflector 236. The pump radiation reflector 236 may reflect the pump beam 208' back to the central portion 206. The pump beam 208' may be reflected through the central portion 206 multiple times before a desired portion of the pump radiation 208' is absorbed in the laser gain or host material of the disk laser gain assembly 204. The absorbed portion of the pump radiation 208' pumps laser ions in the central portion 206 to a laser transition. At least some of the excited laser ions may decay to a lower state by spontaneously emitting photons.

Figure 1:
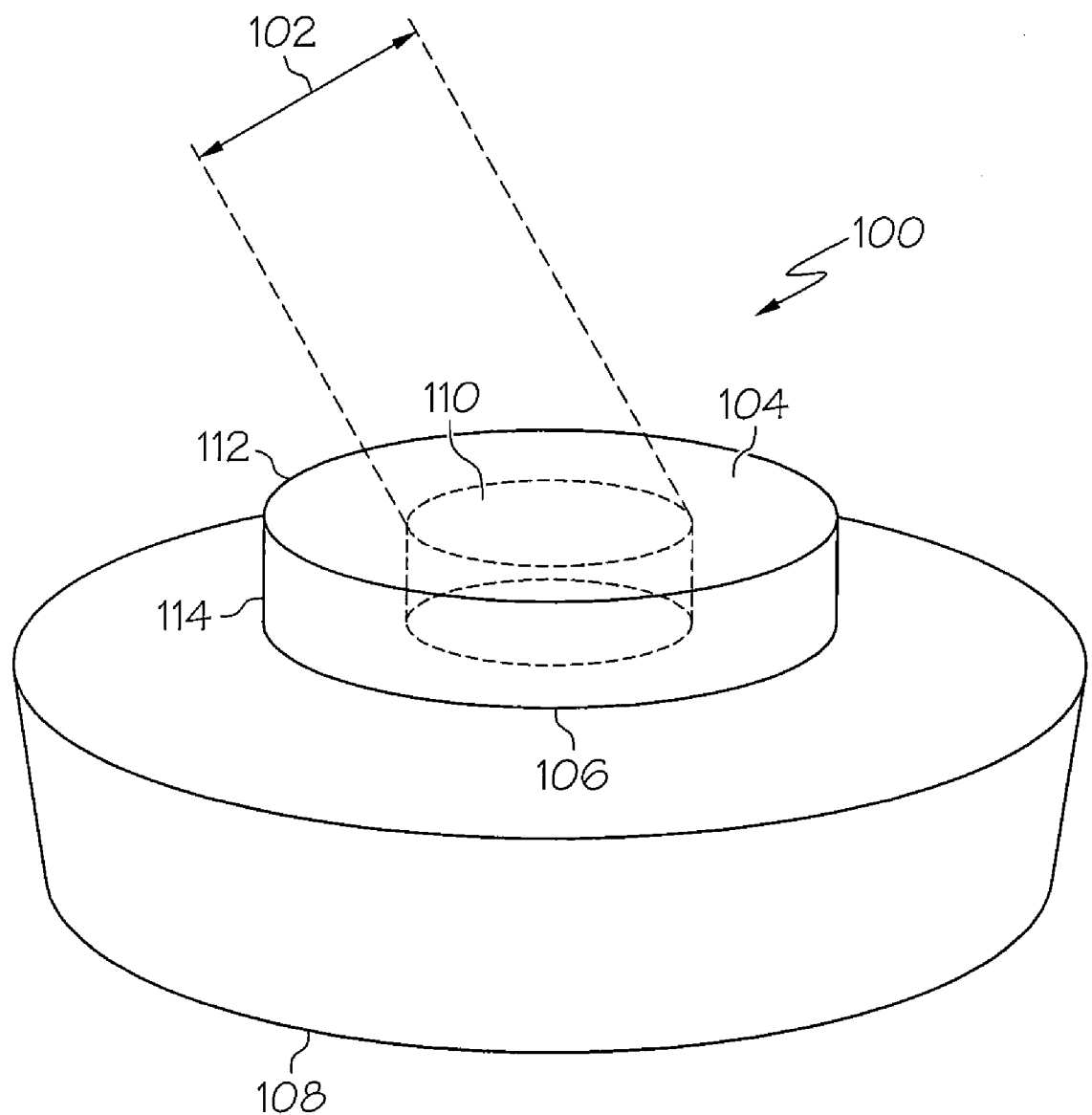
FIG. 1 is an illustration of a prior art thin disk laser.

A substantial portion of such spontaneously emitted photons may be trapped between the front surface 226 and the back surface 230 of the laser gain assembly 204. The trapped photons may propagate on generally zigzag-like trajectories toward the edge portion 212 while being amplified (multiplied) in the process. In accordance with an embodiment of the present invention, the edge portion 212 is not substantially illuminated by the pump radiation 208 and thus represents an efficient absorber of photons or ASE. Thus, the edge portion 212 serves as an absorber of ASE and defines an ASE suppression feature. Because the concentration of laser ions ($Yb^{3+}$ ions or other possible laser ions listed above) in the edge portion 212 is substantially higher than in the central portion 206, the edge portion 212 is a more effective absorber than it would have been if the central portion 206 and edge portion 212 were doped at the same level as in the prior art system of FIG. 1. In particular, the threshold for parasitic lasing is substantially increased and the possibility for damage of the disk laser gain assembly 204 is substantially reduced in the laser system 200 of the embodiment of the present invention illustrated in FIG. 2.

In accordance with an embodiment of the present invention, the laser system 200 may be mounted to a vehicle 240 or the vehicle may be part of the laser system 200. The laser system 200 may be mounted to the vehicle by a mechanism 242 to permit the laser beam 216 from the system 200 to be directed or oriented onto an object or target. The mechanism 242 may permit adjustment of elevation and azimuth of the laser beam 216 relative to the vehicle 240.

Figure 3:
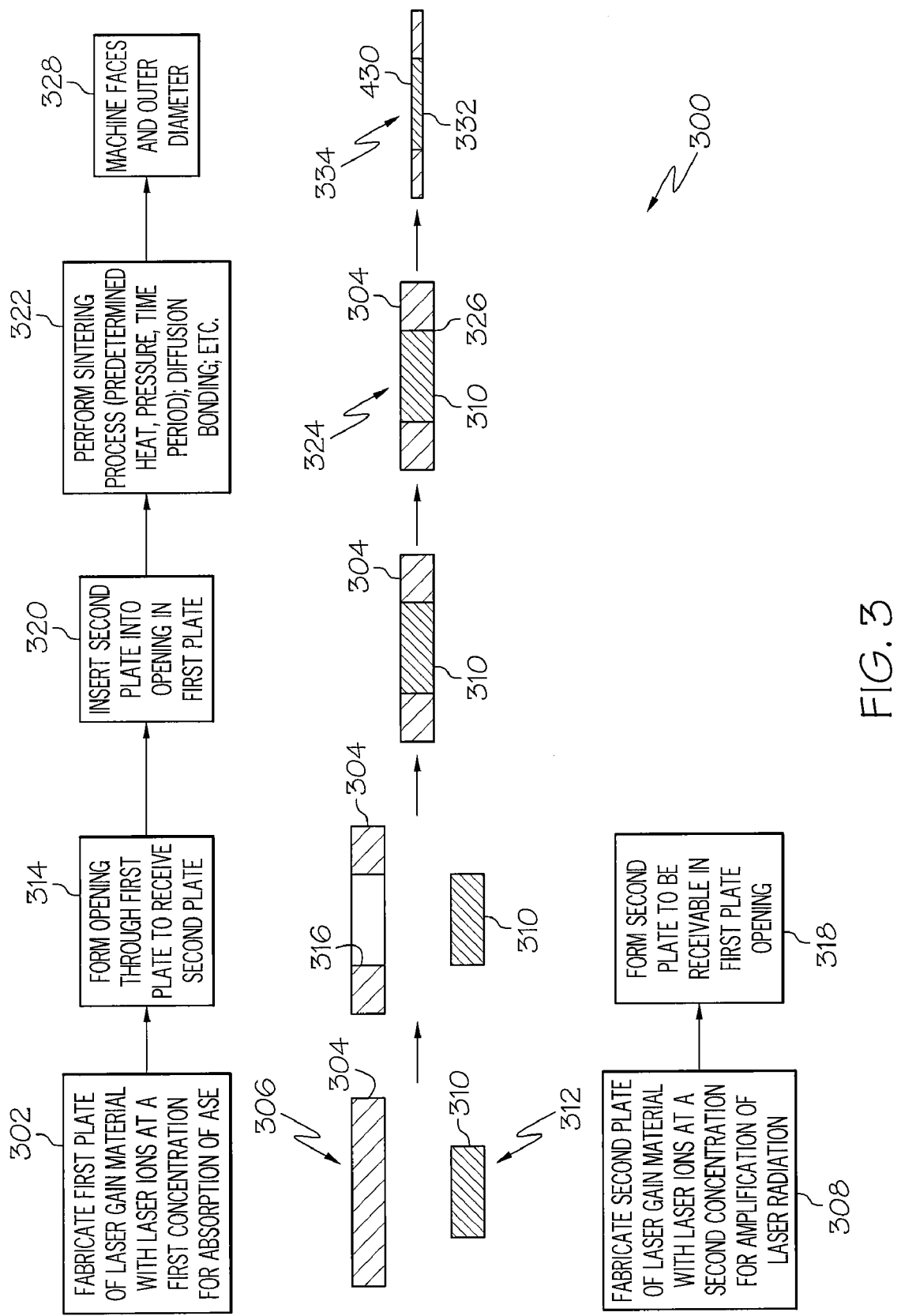
FIG. 3 is a flow chart of an example of a method for making a thin disk laser including an ASE suppression feature in accordance with an embodiment of the present invention.

FIG. 3 is a flow chart of an example of a method 300 for making a thin disk laser including an ASE suppression feature in accordance with an embodiment of the present invention. The method 300 may be used to form the disk gain assembly 204 of FIG. 2. In block 302, a first plate 304 of laser gain material or laser host material may be fabricated with a first predetermined concentration of laser ions 306 to adapt or modify the first plate 304 for absorption or suppression of ASE.

In block 308, a second plate 310 of laser gain material or laser host material may be fabricated with a second predetermined concentration of laser ions 312 to adapt or modify the second plate 310 for amplification of laser radiation.

In block 314, an opening 316 may be formed in the first plate 306 to receive the second plate 310. In block 318, the second plate 310 may be formed or shaped to be receivable into the opening 316 formed in the first plate 304. The second plate 310 may be substantially cylindrically shaped and the opening 316 may be substantially cylindrically shaped to receive the second plate 310.

In block 320, the second plate 310 may be inserted into the opening 316 in the first plate 304. In block 322, the first plate 304 and the second plate 310 may be joined at their interface by any suitable technique. If first plate 302 and second plate 310 are fabricated from polycrystalline material, such as polycrystalline YAG, a sintering operation or process may be performed to join the first plate 304 and the second plate 310 to form an optically continuous and monolithic body 324 having substantially minimal variation in the index of refraction across the interface 326. In another embodiment of the present invention, the first plate 304 and the second plate may be joined by diffusion bonding or any suitable means to form an optically continuous and monolithic body 324 with minimal variation in the index of refraction across the interface 326.

In block 328, the opposite faces or surfaces 330 and 332 may be machined to optical flatness and mutual parallelism. The disk 324 may have a thickness of about 100 to about 300 micrometers. The first plate or central portion 310 may have a diameter of about 1 to about 15 millimeters and the second plate or edge portion 304 may have a diameter of about 10 to about 30 millimeters. The outer diameter of the disk 324 may also be machined as may be needed for the particular system or implementation.

Figure 4:
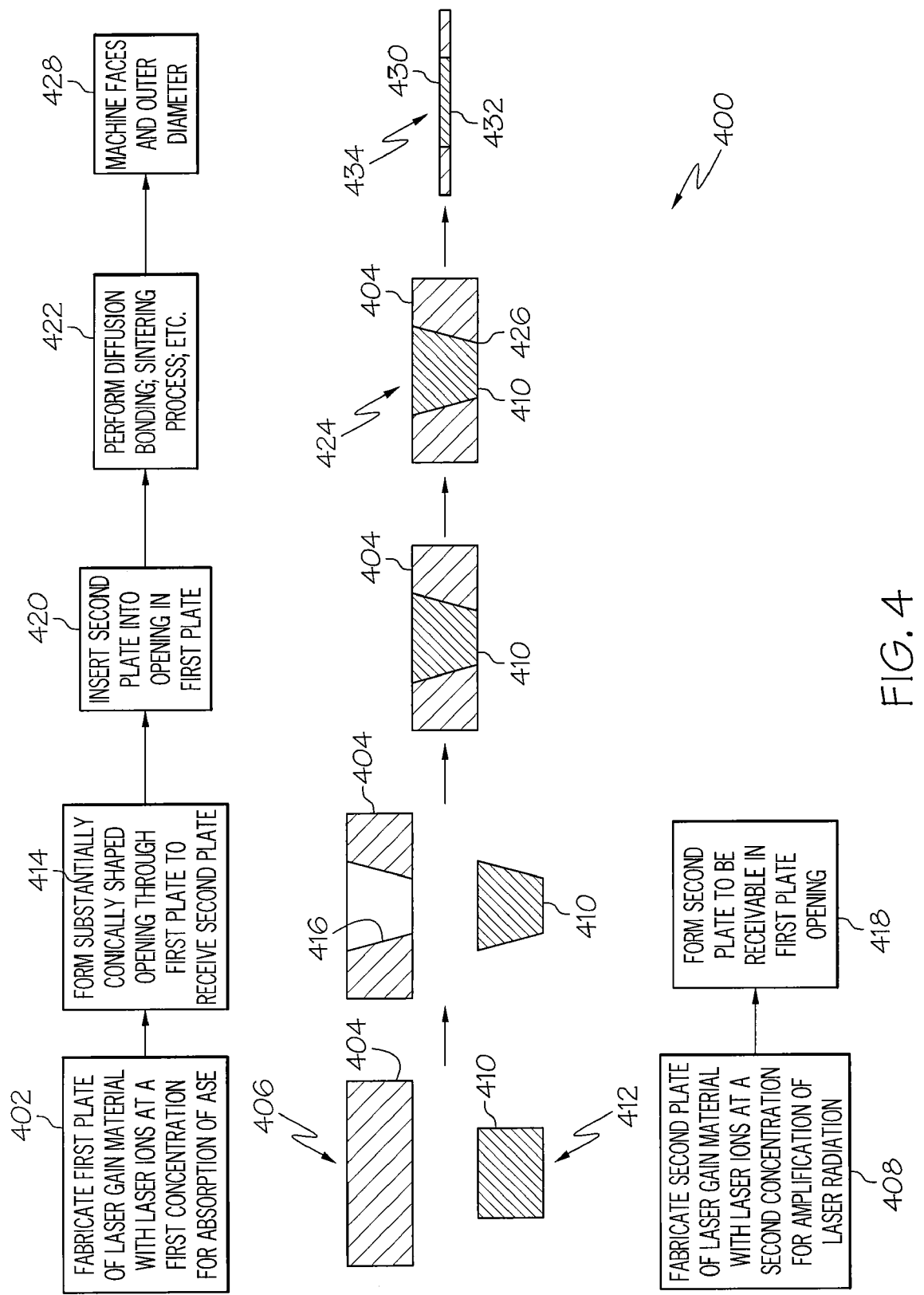
FIG. 4 is a flow chart of an example of a method for making a thin disk laser including an ASE suppression feature in accordance with another embodiment of the present invention.

FIG. 4 is a flow chart of an example of a method 400 for making a thin disk laser including an ASE suppression feature in accordance with another embodiment of the present invention. The method 400 may be used to form the disk gain assembly 204 of FIG. 2. In block 402, a first plate 404 of laser gain material or laser host material may be fabricated with a first predetermined concentration of laser ions 406 to adapt or modify the first plate 404 for absorption or suppression of ASE.

In block 408, a second plate 410 of laser gain material or laser host material may be fabricated with a second predetermined concentration of laser ions 412 to adapt or modify the second plate 410 for amplification of laser radiation.

In block 414, an opening 416 may be formed in the first plate 406 to receive the second plate 410. The opening 416 may be substantially conically shaped. In block 418, the second plate 410 may be formed or shaped to be receivable into the opening 416 formed in the first plate 404. The second plate 410 may be formed to be substantially conically shaped for reception into the opening 416 of the first plate 404.

In block 420, the second conically shaped plate 410 may be inserted into the opening 416 in the first plate 404. In block 422, the first plate 404 and the second plate 410 may be joined at their interface by any suitable technique. If first plate 404 and second plate 410 are fabricated from polycrystalline material such as polycrystalline YAG, a sintering operation or process may be performed to join the first plate 404 and the second plate 410 to form an optically continuous and monolithic body 424 having substantially minimal variation in the index of refraction across the interface 426. In another embodiment of the present invention, the first plate 404 and the second plate 410 may be joined by diffusion bonding.

In block 428, the opposite faces or surfaces 430 and 432 may be machined to optical flatness and mutual parallelism. The monolithic body 424 may also be sliced into sections to form multiple disk assemblies similar to composite assembly 434. The process or method 400 illustrated in FIG. 4 may be more efficient requiring less extensive and costly machining than the process 300 illustrated in FIG. 3. The composite assembly 434 may be used for the laser gain assembly 204 of FIG. 2. The outer diameter of the disk 334 may also be machined as may be needed for the particular system or implementation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A laser system, comprising:
a laser disk, comprising:
a front surface;
a back surface opposite to the front surface;
a first portion of laser host material adapted for amplification of laser radiation; and
a second portion of laser host material completely surrounding the first portion of laser host material between the front surface and the back surface and adapted for suppression of ASE, wherein the first portion of laser host material and the second portion of laser host material are both doped with laser ions, each at a different predetermined concentration of laser ions; and
a heat exchanger thermally coupled to the back face of the laser disk to dissipate heat from the first portion and the second portion.

2. The laser system of claim 1 wherein the first portion of laser host material comprises doping with laser ions at a first predetermined concentration for amplification of laser radiation, and wherein the second portion of laser host material comprises doping with laser ions at a second predetermined concentration for absorption of ASE.

3. The laser system of claim 2, wherein the second predetermined concentration is substantially higher than the first predetermined concentration.

4. The laser system of claim 2, wherein the laser ion comprises a quasi-3 level ion.

5. The laser system of claim 2, wherein the first portion is doped with different laser ions from the second portion.

6. The laser system of claim 1, wherein the laser host material is selected from a group comprising yttrium aluminum garnet (YAG); gadolinium gallium garnet (GGG); gadolinium scandium gallium garnet (GSGG); potassium gadolinium tungstate (KGW); potassium yttrium tungstate (KYW); fluoroapatite (FAP), lithium yttrium fluoride (YLF); phosphate laser glass; silicate laser glass; and sapphire.

7. The laser system of claim 1, wherein the first portion comprises a substantially cylindrical shape and the second portion comprises a substantially annular shape, the first portion being adapted to fit within the second portion with a substantially minimal variation in an index of refraction across an interface between an outer cylindrical face of the first portion and an inner annular face of the second portion.

8. The laser system of claim 1, wherein the first portion is substantially conically shaped and the second portion is substantially annular with a conically shaped opening adapted to receive the first portion.

9. The laser system of claim 1, further comprising a pump radiation source for directing pump radiation on the first portion of laser host material.

10. The laser system of claim 9, further comprising a pump radiation reflector to reflect the pump radiation from the first portion of laser host material back to the first portion of laser host material.

11. The laser system of claim 1, further comprising an antireflective coating formed on the front surface of at least the first portion of laser host material.

12. The laser system of claim 1, further comprising a high-reflectivity coating formed on the back surface of at least the first portion of laser host material.

13. The laser system of claim 1, wherein the first portion and the second portion are co-joined to form an optically continuous and monolithic body including a substantially minimal variation in an index of refraction across an interface between the first and second portions.

14. The laser system of claim 13, wherein the first portion and the second portion are joined by a diffusion bonding process.

15. The laser system of claim 1, further comprising a vehicle, wherein the laser system is mountable to the vehicle.

16. A thin disk laser, comprising:
a front face;
a back face parallel to the front face;
a central portion of laser host material doped with laser ions at a first predetermined concentration for amplification of laser radiation; and
an edge portion of laser host material completely surrounding the central portion between the front face and the back face and doped with laser ions at a second predetermined concentration for suppression of ASE, wherein the second predetermined concentration is substantially higher than the first predetermined concentration.

17. The thin laser disk of claim 16, wherein the central portion is substantially cylindrical and the edge portion is substantially annular, and wherein the central portion is adapted to fit within the edge portion to form an interface between an outer cylindrical face of the central portion and an inner annular face of the edge portion with a substantially minimal variation in an index of refraction across the interface.

18. The thin disk laser of claim 16, wherein the central portion is substantially conical and the edge portion includes a substantially conically shaped opening formed therein to received the central portion to form an interface between an outer conical face of the central portion and an inner conical face of the edge portion with a substantially minimal variation in an index of refraction across the interface.

19. The thin disk laser of claim 16, wherein the central portion and the edge portion are joined together to form an optically continuous and monolithic body with substantially minimal variation in an index of refraction across an interface between the central and edge portions.

20. The thin disk laser of claim 16, further comprising heat dissipation means for receiving heat from the central and edge portions.

21. The thin disk laser of claim 16, further comprising:
an antireflective coating formed on the front face of at least the central portion of the laser host material to pass laser radiation into the laser host material; and
a high-reflective coating formed on the back face of at least the central portion of the laser host material to reflect any laser radiation.

22. The laser system of claim 1, wherein the predetermined doping concentration of the second portion of laser host material is about 10 percent to more than about 50 percent higher than the predetermined doping concentration of the first portion of laser host material.

23. The laser system of claim 1, wherein the first portion of laser host material comprises the predetermined doping concentration of about a 10 percent atomic concentration of laser ions and the second portion of laser host material comprises the predetermined doping concentration of about 15% atomic concentration of laser ions.

24. The laser system of claim 1, wherein the first portion of laser host material and the second portion of laser host material are formed separately for doping at the different predetermined concentrations of laser ions and wherein the first portion of laser host material is inserted within the second portion of laser host material after the first and second portions are doped at the different predetermined concentrations of laser ions.

* * * * *